US008405868B2

(12) United States Patent
Jackson

(10) Patent No.: US 8,405,868 B2
(45) Date of Patent: Mar. 26, 2013

(54) METHOD, APPARATUS AND TECHNIQUE FOR ENABLING INDIVIDUALS TO CREATE AND USE COLOR

(75) Inventor: Andrew Jackson, Monterey, CA (US)

(73) Assignee: Andrew Jackson, Monterey, CA (US)

( * ) Notice: Subject to any disclaimer, the term of this patent is extended or adjusted under 35 U.S.C. 154(b) by 580 days.

(21) Appl. No.: 11/535,643

(22) Filed: Sep. 27, 2006

(65) Prior Publication Data

US 2008/0079965 A1    Apr. 3, 2008

(51) Int. Cl.
  *H04N 1/60* (2006.01)
  *G03F 3/08* (2006.01)
  *G06K 9/34* (2006.01)
  *G06K 9/00* (2006.01)
(52) U.S. Cl. .......... 358/1.9; 358/520; 382/164; 382/162
(58) Field of Classification Search .................... 358/1.9, 358/504, 515, 516, 518, 520, 521, 526, 530, 358/538, 539; 382/165, 164, 167, 162; 347/19, 347/115, 116; 345/589, 593, 594
See application file for complete search history.

(56) References Cited

U.S. PATENT DOCUMENTS

| 4,241,520 | A | * | 12/1980 | Norton ........................... 434/102 |
| 4,337,046 | A | * | 6/1982 | Anderson et al. ............. 434/103 |
| 4,399,353 | A | * | 8/1983 | Adkins et al. ................ 235/78 R |
| 4,414,635 | A | * | 11/1983 | Gast et al. ...................... 382/165 |
| 4,613,947 | A | * | 9/1986 | Suzuka et al. ................ 356/405 |
| 4,751,535 | A | * | 6/1988 | Myers ........................... 347/115 |
| 5,121,198 | A | * | 6/1992 | Maronian ...................... 358/527 |
| 5,334,992 | A | * | 8/1994 | Rochat et al. ................... 345/22 |
| 5,420,607 | A | * | 5/1995 | Miller et al. ................... 345/156 |
| 5,898,491 | A | * | 4/1999 | Ishiguro et al. ............ 356/243.4 |
| 6,072,464 | A | * | 6/2000 | Ozeki ........................... 345/603 |
| 6,377,330 | B1 | * | 4/2002 | Vanderbrook et al. .......... 355/35 |

(Continued)

OTHER PUBLICATIONS

"Andrew Jackson's Guide to Color Mixing™," Instruction Pamphlet and Mixing Guide, Oct. 11, 2002, 5 pages.

(Continued)

*Primary Examiner* — Madelein A Nguyen
(74) *Attorney, Agent, or Firm* — Mahamedi Paradice Kreisman LLP

(57) ABSTRACT

A person can create a desired color through use of a visual aid or tool. The aid or tool may include a plurality of color lines, provided on a medium, on which color can be blended. The plurality of color lines may include: (i) a primary set of color lines, each providing a corresponding primary color that is different than a primary color of another color line in the primary set, and (ii) a secondary set of lines, where each color line in the secondary set is for a corresponding secondary color. Each color line in the primary set includes a plurality of color formations, and each color formation may have a common range of hues that are different of hues of the other color lines in the primary set. The plurality of color formations of each color line are arranged from a highest intensity to a lowest intensity. Each color line in the secondary set includes a plurality of color formations for the corresponding secondary color. The plurality of colors for each color line in the primary set and in the secondary set are arranged from a lowest intensity to a highest intensity. One of the color lines may be identified as either containing the desired color or containing a first primary component of the desired color. Once identified, one of two actions may take place: adjacent color formations from a single color line may be mixed, or color formations from adjacent color lines of relatively equivalent intensity are mixed.

9 Claims, 11 Drawing Sheets

U.S. PATENT DOCUMENTS

| | | | |
|---|---|---|---|
| 6,381,036 B1* | 4/2002 | Olson | 358/1.9 |
| 6,633,407 B1* | 10/2003 | Kim et al. | 358/1.9 |
| 6,925,196 B2* | 8/2005 | Kass et al. | 382/111 |
| 7,062,084 B2* | 6/2006 | Messing et al. | 382/165 |
| 7,502,033 B1* | 3/2009 | Axelrod | 345/593 |
| 2002/0158933 A1* | 10/2002 | Yamamoto | 347/15 |
| 2004/0136013 A1* | 7/2004 | Mestha et al. | 358/1.9 |
| 2004/0170912 A1* | 9/2004 | Brennan | 430/108.6 |
| 2004/0238722 A1* | 12/2004 | Hiromatsu | 250/208.1 |
| 2005/0195137 A1* | 9/2005 | Richards et al. | 345/84 |
| 2005/0213125 A1* | 9/2005 | Smith et al. | 358/1.9 |
| 2005/0219404 A1* | 10/2005 | Kobayashi | 348/362 |
| 2005/0280845 A1* | 12/2005 | Hussie | 358/1.9 |
| 2006/0050927 A1* | 3/2006 | Klomark et al. | 382/103 |
| 2006/0103860 A1* | 5/2006 | Wilson | 358/1.9 |
| 2006/0132872 A1* | 6/2006 | Beretta | 358/518 |
| 2006/0164663 A1* | 7/2006 | Luo et al. | 358/1.9 |
| 2006/0170699 A1* | 8/2006 | Morgan et al. | 345/592 |
| 2006/0232802 A1* | 10/2006 | Gray et al. | 358/1.9 |
| 2007/0013965 A1* | 1/2007 | Iwanaga | 358/406 |
| 2007/0076013 A1* | 4/2007 | Campbell et al. | 345/589 |
| 2007/0288406 A1* | 12/2007 | Visel | 706/14 |
| 2008/0044082 A1* | 2/2008 | Muller | 382/162 |
| 2008/0198179 A1* | 8/2008 | Doser | 345/690 |
| 2008/0299521 A1* | 12/2008 | Taylor et al. | 434/98 |
| 2009/0079791 A1* | 3/2009 | Wilcox | 347/43 |

OTHER PUBLICATIONS

An Exhibit Compact Disk (CD) Color Document is enclosed with this submission.

* cited by examiner

METHOD, APPARATUS AND TECHNIQUE FOR ENABLING INDIVIDUALS TO CREATE AND USE COLOR

TECHNICAL FIELD

The disclosed embodiments relate generally to the field of color creation and use, and more particularly, to a technique, system and method for enabling individuals to create and use color.

BACKGROUND

Numerous color selection devices and techniques exist for enabling individuals to select color. Such techniques often present to the individual a means by which new colors can be formed from combination of other colors. For example, techniques exist by which a user can make brown paint by mixing tubes of red paint with green paint. More advanced techniques are used to enable the individual to obtain a precise, hue, tint/tone, and intensity

DETAILED DESCRIPTION

Figure 1A:
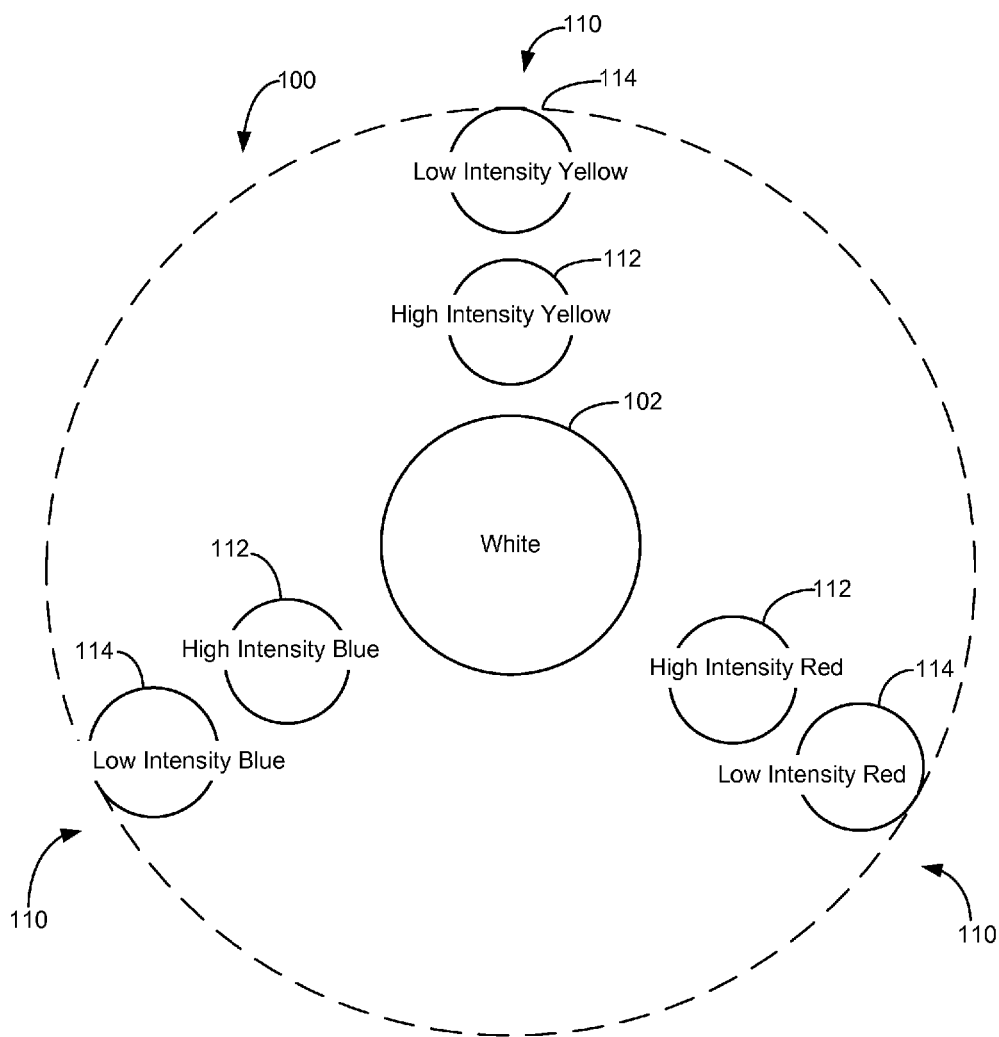
FIG. 1A-FIG. 1C illustrate formation of a color wheel for enabling implementation of a technique to mix colors, under one or more embodiments of the invention.

Embodiments described herein enable individuals to create and use color in a manner that preserves hue and color integrity. While numerous color mixing techniques exist to create a desired color, most generally blend colors on varying ends of the color spectrum on the theory that mixing will create a desired color. However, such approaches often result in color pollution, where hues from different color spectrum clash and form murkiness in the resulting color. This form of pollution is exasperated when individuals add white or black to tint or tone the color.

What embodiments described herein provide is the ability for a casual user or painter to mix colors in a manner that preserves hue and color integrity. Rather than mixing colors from different ends of the spectrum, embodiments provide for "in-hue" mixing and blending to develop components of a desired color.

One or more embodiments enable persons to create a desired color through use of a visual aid or tool. The aid or tool may include a plurality of color lines, provided on a medium, on which color can be blended. The plurality of color lines may include: (i) a primary set of color lines, each providing a corresponding primary color that is different than a primary color of another color line in the primary set, and (ii) a secondary set of lines, where each color line in the secondary set is for a corresponding secondary color. Each color line in the primary set includes a plurality of color formations, and each color formation may have a common range of hues that are different of hues of the other color lines in the primary set. The plurality of color formations of each color line are arranged from a highest intensity to a lowest intensity. Each color line in the secondary set includes a plurality of color formations for the corresponding secondary color. The plurality of colors for each color line in the primary set and in the secondary set are arranged from a lowest intensity to a highest intensity. One of the color lines may be identified as either containing the desired color or containing a first primary component of the desired color. Once identified, one of two actions may take place: adjacent color formations from a single color line may be mixed, or color formations from adjacent color lines of relatively equivalent intensity are mixed.

Another embodiment provides for an apparatus that enables a person to create a desired color on a medium that includes a plurality of markings. Each of the plurality of markings is configured to designed to carry a corresponding material of a particular color. The plurality of markings may be are arranged so that when each of the markings carries the corresponding material of the particular color, the markings form a plurality of color lines arranged about a center. The markings may include a primary set of color lines. Each color line in the primary set is for a corresponding color and includes a first color line, a second color line. Each color line in the primary set also includes a plurality of color formations that each have a common range of hues that are different than hues of other color lines in the primary set. Furthermore, the plurality of color formations of each color line are arranged from a highest intensity to a lowest intensity. A secondary set of color lines may also be provided for a corresponding secondary color, wherein at least one color line from the secondary set is provided to transition from one color line in the primary set to another color line in the primary set. Each color line in the secondary set includes a plurality of color formations that each have a common range of hue that are different of a hue of other color lines in the secondary set.

According to another embodiment, a computer-readable medium carries instructions for enabling a person to create a desired color. The instructions can be executed by one or more processors to cause the one or more processors to perform steps that include displaying a plurality of color lines, where each color line includes a plurality of color formations. An input action may be detected from the person corresponding to the person selecting a first color formation and a second color formation from one or more of the color lines. A blended color formation may be provided from the first color formation and from the second color formation. In displaying the color lines, one or more embodiments contemplate use of a wheel, which includes a primary set of color lines and a secondary set of color lines.

Technique

Figure 1B:
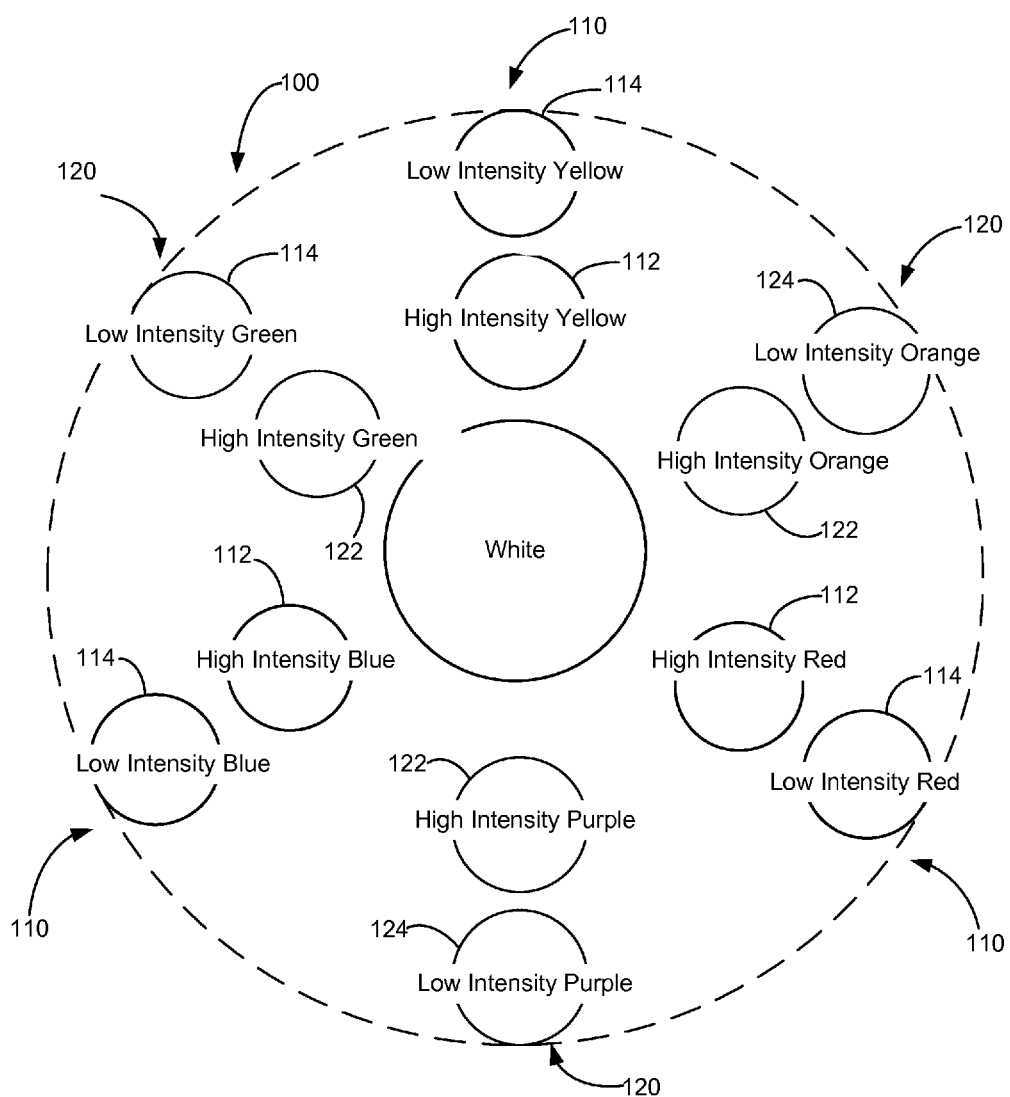
Figure 1C:
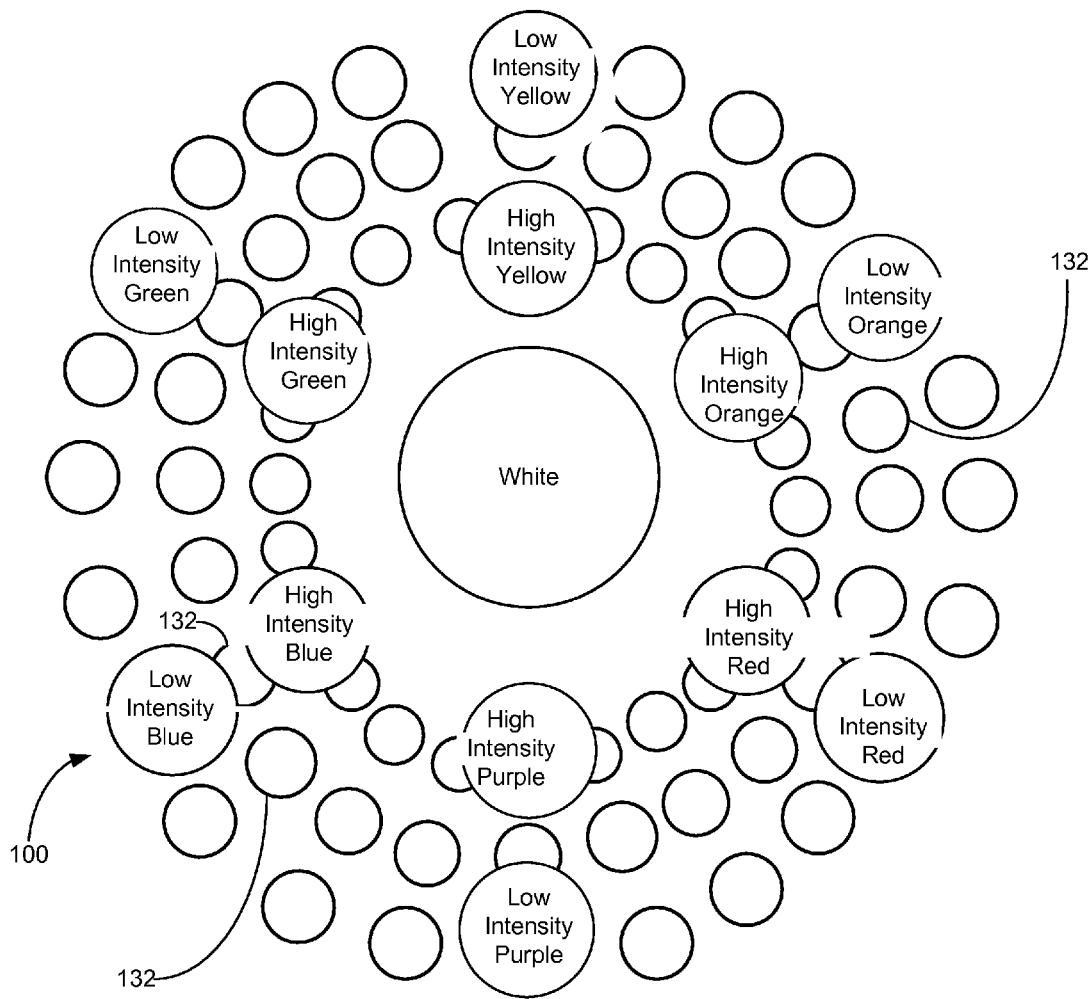

FIG. 1A-FIG. 1C illustrate formation of a color wheel 100 for enabling implementation of a technique to mix colors, under one or more embodiments of the invention. FIG. 1A illustrates a diagram where three primary color lines 110 are arranged about a center 102. The center 102 provides the color white. It is generally understood in the field that the three primary colors are red, blue and yellow, although there may be other conventions. Each primary color line 110 is provided a high intensity color formation 112 and a low intensity color formation 114. The collection of the six color formations 112, 114 provide the primary hues for the wheel 100. The arrangement of the primary color lines 110 is in a spoke formation, so that as more color lines can be added to form the wheel 100.

FIG. 1B illustrates the color wheel 100 with the addition of three secondary color lines 120. Each of the secondary color lines 120 correspond to a general color (with its various intensity levels) that is about in the "middle" of the general color of two primary color lines 110. In the case where the primary color lines 110 provide red, yellow and blue, the three secondary color lines 120 provide orange/brown, green and violet. Each secondary color line 120 is provided a high intensity formation 122 and a low intensity color formation 124. The combination of the high and low intensity formations 122, 124 of the secondary color lines 120 provide six secondary hues of the wheel 100.

FIG. 1C illustrates a complete wheel 100, with intermediate color formations 132 provided in between and around the six primary hues and six secondary hues. The exact number of color formations on each wheel may be one of a design choice, implementation or use. Under an embodiment such as shown by FIG. 1C, numerous color formations are provided on each color line, reflecting different intensity values of the general color of that color line 110, 120. The color formations on each color line are arranged from low intensity to high intensity.

Furthermore, the number of color lines used is also of design choice. For example, while embodiments described herein provide for the use of six color lines (three primary and three secondary color lines), a third or fourth set of color lines can also be used. There is also no need to maintain symmetry as between color lines and the formation of the wheel 100, although symmetry provides ease of use.

Color Mixing

Embodiments described with FIG. 2A, FIG. 2B, and FIG. 3A, FIG. 3B illustrate techniques for mixing color using a wheel or arrangement, such as described with FIG. 1. The techniques described may be implemented in various forms. Under one implementation, each color formation 112, 114, 122, 124 is provided in the form of tube paint. For example, the wheel 100 may be provided on a painter's mixing surface, and each color formation is provided from a commercially sold tube of color. Other implementations and mediums (e.g. computer-generated, commercial paint) on which the color can be carried are described in more detail below. For purpose of descriptiveness, however, examples provided with embodiments of FIG. 2A and FIG. 2B, and FIG. 3A and FIG. 3B, assume implementation with tube paint. Furthermore, reference is made to FIG. 1A-FIG. 1C for illustrative purposes. The mixing technique is made possible because the wheel 10-0 sorts and presents different hues of the same general color on one line, arranged by intensity.

Figure 2A:
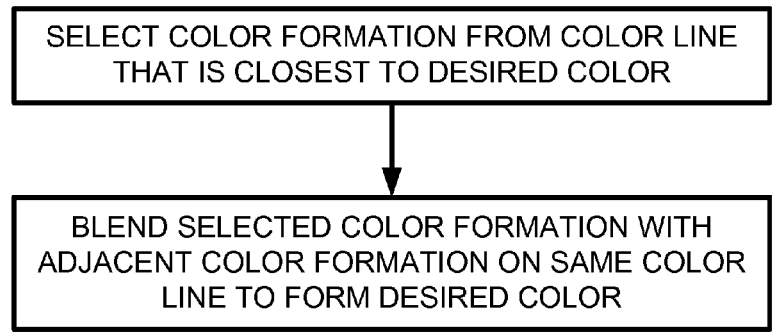
FIG. 2A illustrates an "in-color line" mixing technique, according to an embodiment of the invention.

In FIG. 2A, an "in-color line" mixing technique is illustrated. An in-color line mixing is one where the desired color that is to be created is in one of the color lines 110, 120 provided on the wheel 100. Specifically, the desired color may be one that has a place on one of the color lines 110, 120, but has an intensity that is not reflected by one of the existing color formations 112, 114, 122, 124. In order to create the desired color, a step 210 provides that the user selects the color formation that is the closest match to the color that he or she wants. Then in step 220, the user mixes the selected color formation with the adjacent color formation of that same color line.

Figure 2B:
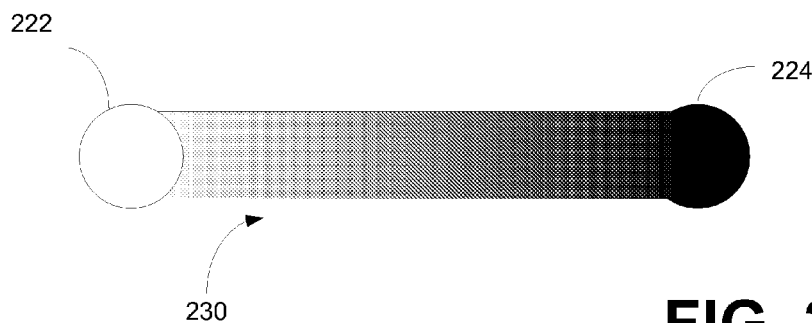
FIG. 2B illustrates an implementation of an embodiment such as described with FIG. 2A.

In the context of color mixing, FIG. 2B illustrates an implementation where a user takes paint material from a first color formation 222 and mix it with paint material from a second color formation 224, where the first and second color formation is in the same color line 230. Each color formation forms a component of the desired color. With the mixing of the two materials, the user can blend and weight paint from each formation until the desired hue and intensity level is developed. Thus, one can, for example, form a desired shade of orange by mixing brown (low intensity) with bright orange (high intensity). When color lines have more than two color formations, the color formations used to form the mix may be closer to the desired color. In the example provided, an embodiment of FIG. 2A and FIG. 2B provides for the ability to create a rich in-color line mix of a desired color, with no pollutant color component from another color line.

Figure 3A:
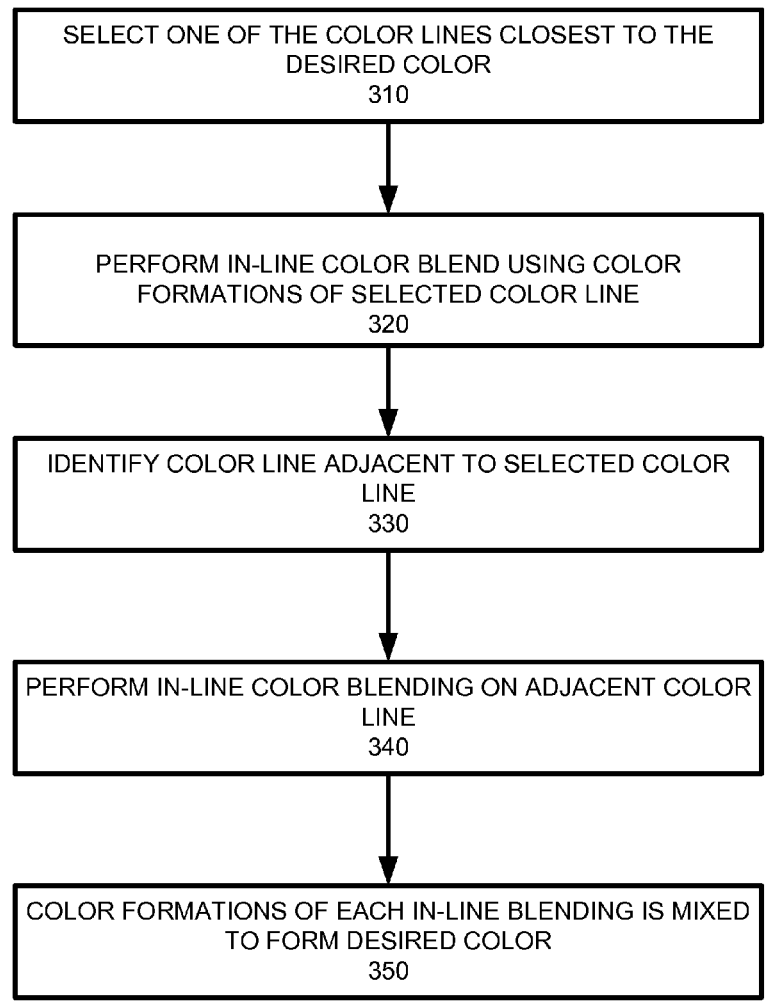
FIG. 3A illustrates a "cross-color line" mixing technique, according to an embodiment of the invention.

FIG. 3A illustrates a cross-color line mixing technique, under an embodiment of the invention. In step 310, one of the color lines 110, 120 closest to the desired color is selected. The user may simply view the color lines to make the selection of the color line with, for example, the hue that is closest to the desired colored.

In step 320, the user performs an in-color line color blend using color formations of the selected color line in order to develop a color formation that is close to the desired color in hue and in intensity. The in-color line blend may be performed using, for example, an embodiment described with FIG. 2.

Step 330 provides that a color line that is adjacent to the selected color line is identified. Step 340 provides that a similar in-color line mixing is performed to develop a color formation having the intensity that is similar to the desired color.

In step 350, the color formations developed with steps 320 and 340 are blended to form a color formation of the desired color. The amount that each component formation is needed may vary on what the desired color is.

Figure 3B:
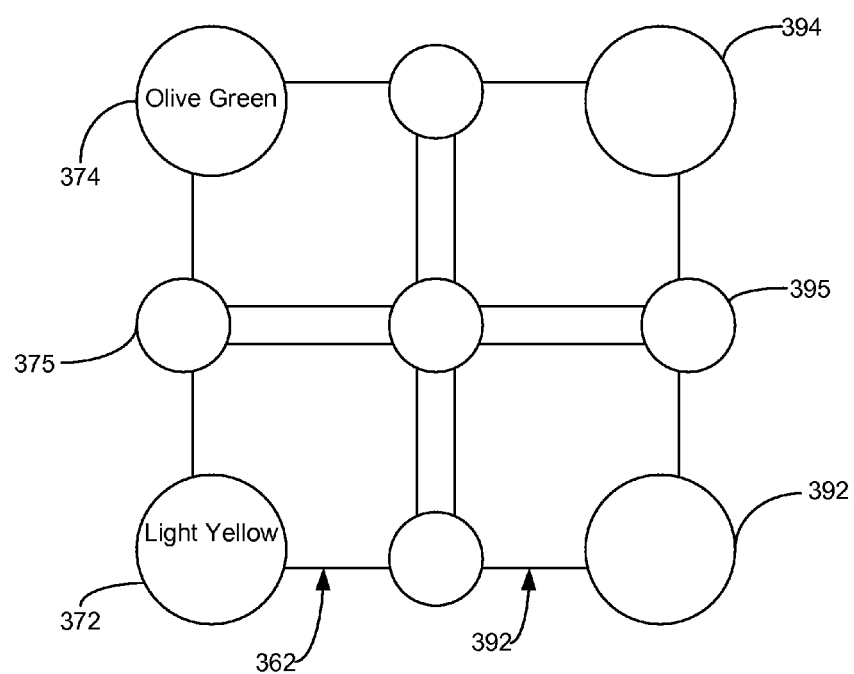
FIG. 3B illustrates an implementation of a method such as described with FIG. 3A of mixing tube paint.

FIG. 3B illustrates an implementation of a method such as described with FIG. 3A, in the context of mixing tube paint, under an embodiment of the invention. In FIG. 3B, an in-color line blend is performed on a first color line 362 (selected in step 320), using two adjacent color formations 372, 374 of the selected color line selected. In order to perform the in-color line blend, paint material from two adjacent formations 372, 374 may be combined into a mixing point 375. As such, each color formation 372, 374 forms a component of the desired color. In an adjacent color line 382, a similar in-color line blend is performed using two adjacent color line formations 392, 394 to form a mixing point 395. The desired color formation 398 is then formed by mixing material from the color formations 375, 395.

In an embodiment such as described with FIG. 3A and FIG. 3B, desired color is created without the need to use black, white, or the mixing of colors that are disparate on the color spectrum. The result is a richer hue, without murkiness of color pollution. Furthermore, a user can develop the desired color intuitively, with little expertise or effort.

Tint and Tones

Some colors have intensity levels that are higher than the color formations on a color line. Such colors are "tints". Likewise, some colors have intensity levels that are lower than the intensity of the color formations on a color line. Such colors are "tones". In general, adding white to a low-intensity hue of a color line will result in a tone. Adding white to a high intensity hue of a color line will result in a tint.

Figure 4:
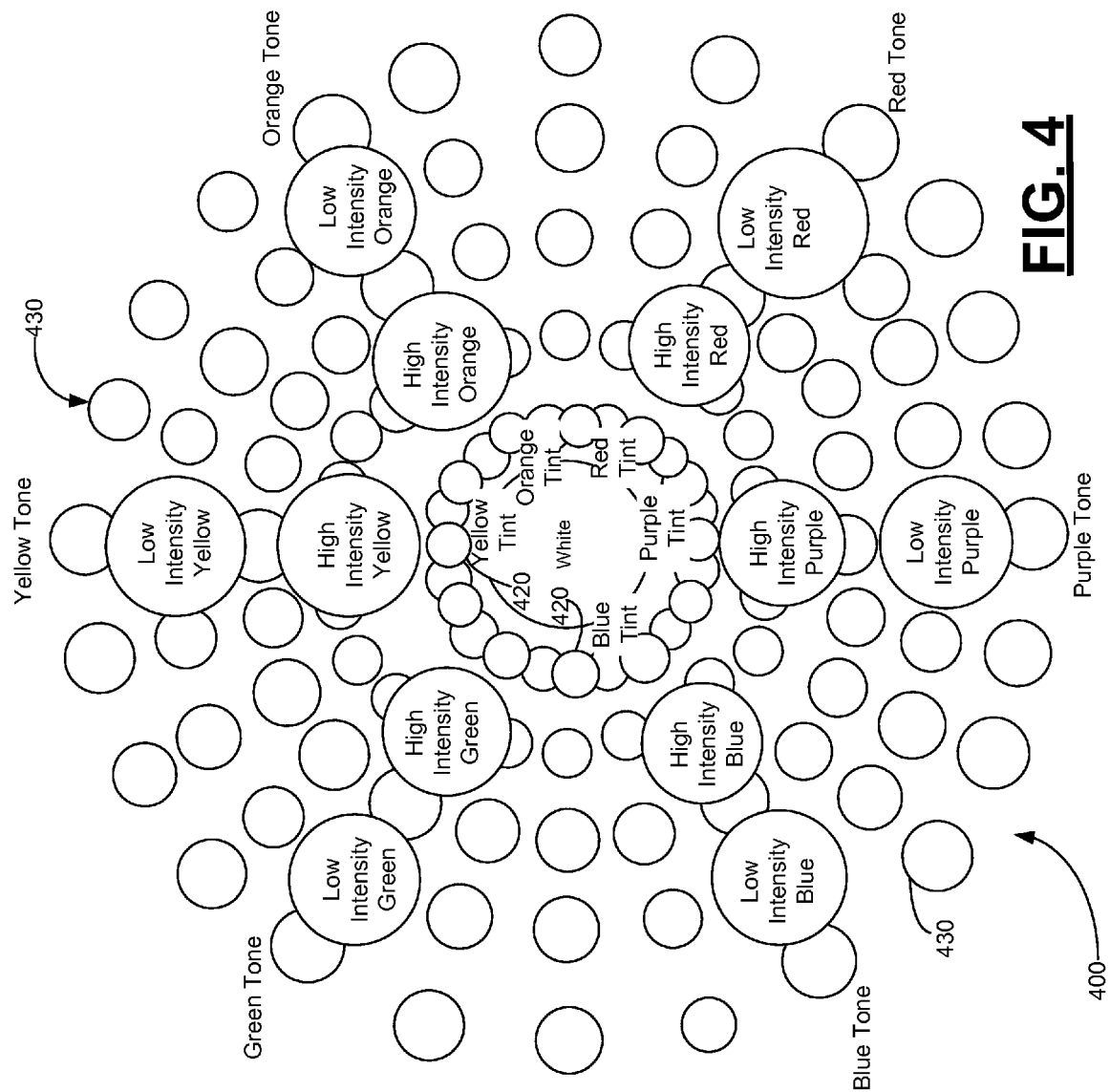
FIG. 4 illustrates a color wheel with tint and tone formations, under an embodiment of the invention.

FIG. 4 illustrates a color wheel 400 with tint and tone, under an embodiment of the invention. In order to add the tint, the high intensity color formations 112, 122 of each color line are blended with white, in varying degrees. The result is a tint formation 420 with numerous tint levels. Under one implementation, the highest color intensity formation may be used, or alternatively, a color formation between the two highest color intensities.

Likewise, low intensity color formations 114, 124 of each color line is blended with white, in varying degrees, to create a tone formation 430. The tone formation 430 may also have varying degrees. Under one implementation, the lowest color intensity formation may be used, or alternatively, a color formation between the two lowest color intensities.

Tints and tones can be presented on the wheel 400 in various forms. In general, tints and tones can be mixed with one another, or with color formations of other color lines to blend white with a color that is more rich in hue.

Color Matching Application

Numerous applications are contemplated by one or more embodiments of the invention. Among the applications considered, an embodiment provides for creating a color to match another color that is present on another surface.

Figure 5:
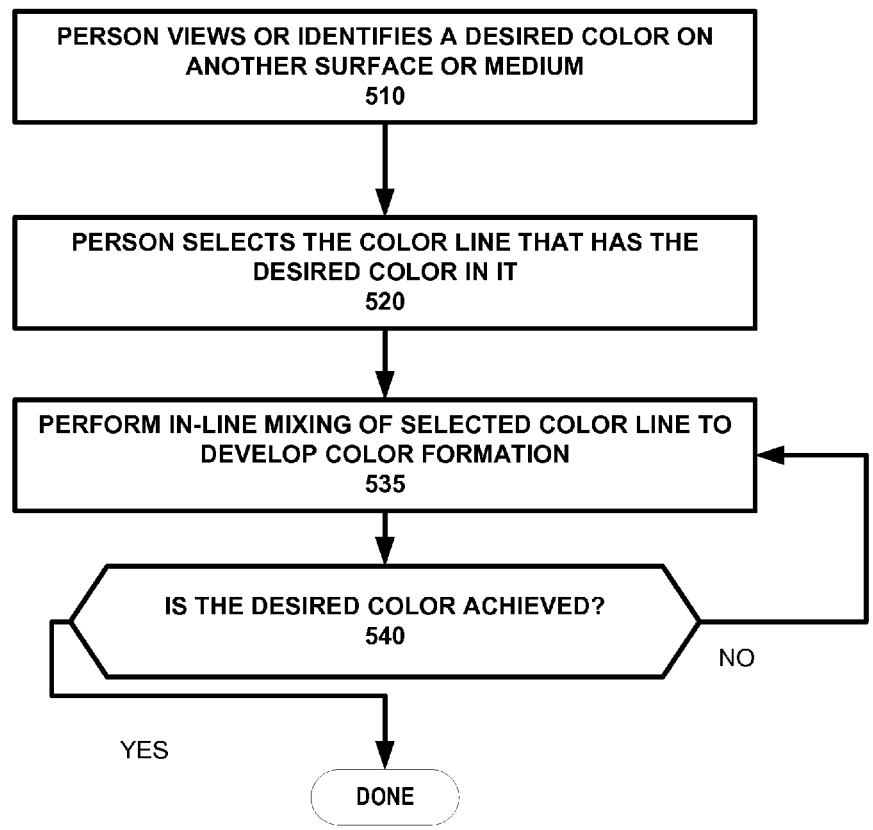
FIG. 5 illustrates a technique for enabling a person to match a color, under an embodiment.

FIG. 5 illustrates a method for in-color line color matching to a desired color, under an embodiment of the invention. Reference may be made to the color wheel of FIG. 4 for illustrative purposes only.

In a step 510, a person views or identifies a desired color on another surface or medium. In step 520, a person selects the color line that has the desired color in it, using, for example, the wheel 400.

Step 530 provides that the user performs in-color line mixing to develop an initial color formation. A determination is made in step 535 to determine if the desired color is achieved. If it is achieved, the user is done, else step 530 is performed again. If the user is close, but off with tint or tone, the user may in step 540 blend white to achieve the desire color with tint or tone.

Figure 6:
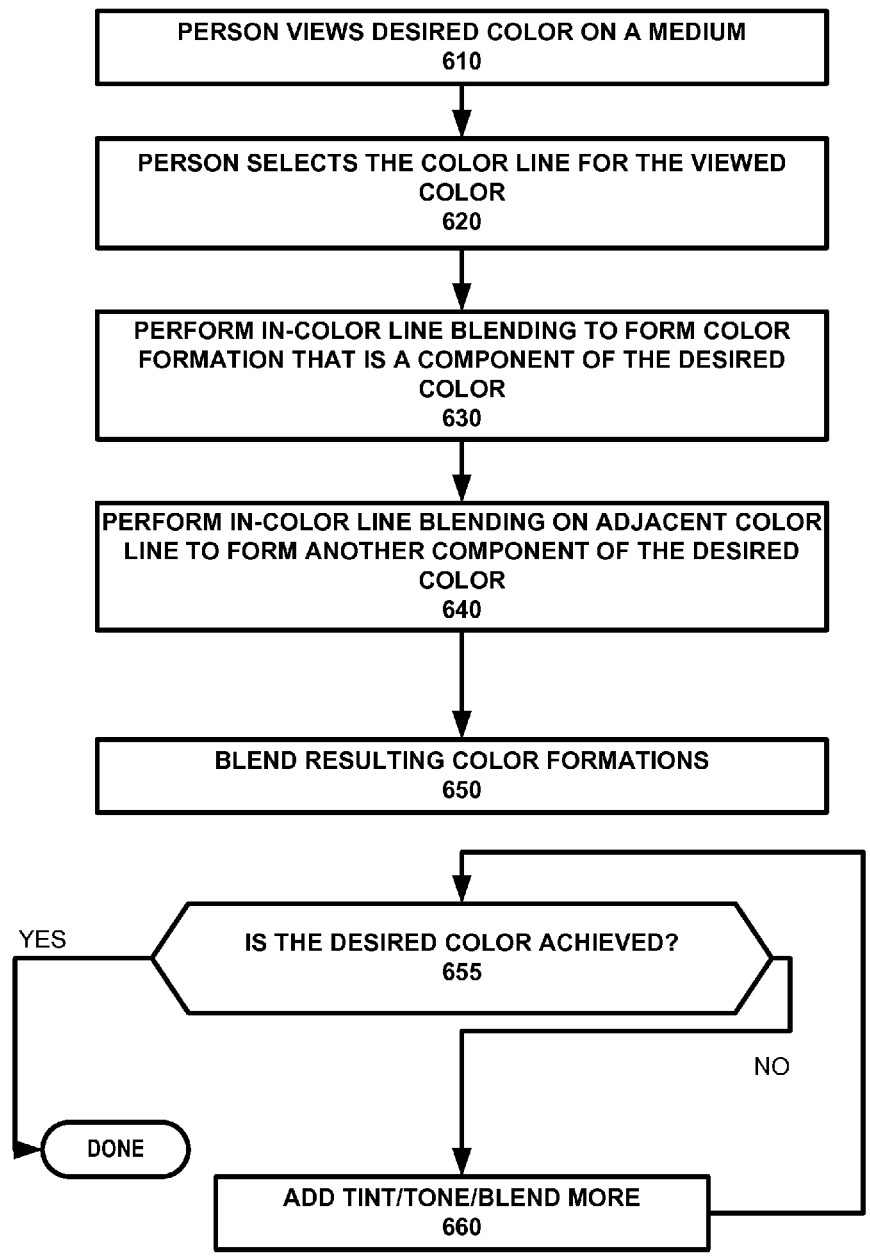
FIG. 6 illustrates a technique for enabling a person to match a color having tint or tone, under an embodiment of the invention.

FIG. 6 illustrates a method for cross-line color matching to a desired color, under an embodiment of the invention. As with FIG. 5, reference may be made to the color wheel of FIG. 4 for illustrative purposes.

In a step 610, a person views or identifies a desired color on another surface or medium. In step 620, a person selects the color line that the user can identify (visually or otherwise) has the color formation that is close to the desired color. The general color of the color line has the hue or specific color that is to form a primary component of the end mixed result. A color wheel such as described with FIG. 1C or with FIG. 4 may be used to perform this step.

Step 630 provides that the user performs in-color line mixing of the color line identified in step 620 to form a first color formation. The result of performing this step is a color formation that is a primary component of the desired color.

In step 640, the user perform in-color line color matching of an adjacent color line to identify a second color formation that is a component of the desired color. The color formation from the second color line forms another primary component of the desired color.

Step 650 provides that the first color formation of step 630 is blended or mixed with the second color formation of step 640.

In step 655, a determination is made as to whether the desired color is achieved by the blending or mixing for the two color formations. If the desired color is achieved, the user is done. Otherwise, in step 660, the user can blend further and also add tint or tone as needed. The color white is added to make the tint or tone (assuming the color formation is at high intensity or low intensity respectively). As an addition or alternative, more blending may be performed of the color formations that are the components of the desired color. The determination of step 655 is performed until the desired color is achieved.

Paint Mix Template

In performing techniques such as described with FIG. 2A, FIG. 2B, FIG. 5 or FIG. 6, one or more embodiments contemplate that the user will have the aid of a wheel (such as described with FIG. 1A-FIG. 1C as a guide. For example, the wheel 100 (FIG. 1C) may be a visual guide, in which case the user may use it as a tool that he views. Alternatively, the wheel 100 may be on medium, such as a tray or a tablet from which the user can mix paint. The wheel 100 may even hold paint for the user in designated holding regions, and identify what brand, make or paint identification number to deposit on a particular holding region to make a desired wheel.

Accordingly, under one embodiment, a platform or tablet is provided on which holding regions for paint are provided. The holding regions may identify colors or paint for forming a wheel such as described above.

Figure 7:
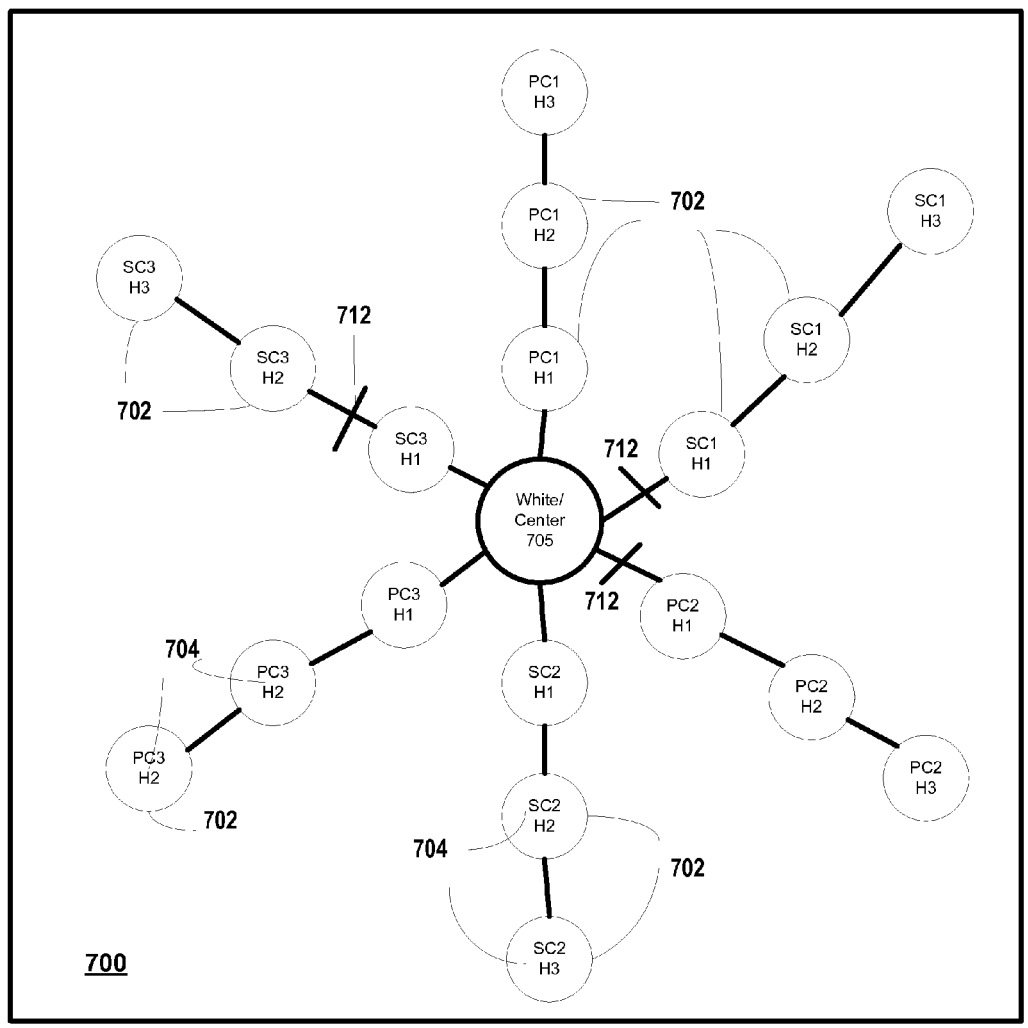
FIG. 7 illustrates a paint mixing template or kit, according to an embodiment of the invention.

FIG. 7 illustrates another embodiment in which a tablet 700, tray or other medium is provided to guide the user in performing techniques described with embodiments of the invention. The tablet 700 may include a plurality of holding regions 702 that retain paint, or other coloring material. The holding regions 702 may be sunken, bowl-shaped, or other recess formations. The holding regions 702 may also include markers 704 that identify what paint or coloring material the user should deposit in that particular holding region. For example, with tube paint, different manufacturers have different paint numbers or identifiers (e.g. "sky blue" or "blue23") that provide specific colors. In this way, the markers 704 identify what coloring material is to be deposited in each holding region 702. When deposited, the user can form the color formations of a wheel such as described with FIG. 1C or FIG. 4.

According to an embodiment, mixing regions 712 may be provided in various regions on the tablet 700, including between each holding regions 702. The mixing regions 712 enable the user to mix paint from adjacent pairs of holding regions 702 to form a desired color. For example, a user may any of the techniques described with FIG. 2A and FIG. 3A.

With regard to tint and tones, separate mixing or holding regions 722, 724 may be provided on the inner and outer periphery of a wheel shaped by the holding regions 702. In one embodiment, the user adds his own paint mixtures, including white paint (which may be held in a separate holding regions in the center 705 of the tablet). Thus, the user can blend in tones with designated mixing or holding regions where white can be added to a paint or other coloring material.

In one embodiment, the tablet 700 may form part of a kit that includes other material to enable the individual to practice techniques as described with embodiments of the invention. The kit may include, for example, paint tubes that the person can use to deposit coloring material into corresponding holding regions 702. Alternatively, the kit can specify what paint tubes the individual should purchase from a given manufacturer.

Under an embodiment, the tablet 700 is formed from glass or similar material that enables paint material to be cleanly blended with a paint brush or stick, then cleaned off.

Computer-Implemented User-Interface

One or more embodiments described herein may be implemented through use of a computer-implemented user-interface. In a computer-implemented embodiment, a user-interface 800 comprises color formations that form portions of color lines 810. The color formations 802 are provided by pixel regions or other display regions. Each such region may correspond to a color formation, such as described with color wheel 100 (FIG. 1C) and 400 (FIG. 4). The color regions 802 may be generated by a processor executing software or other instructions, where color having a specific hue and intensity is generated for each color region 802. The color regions 802 may be discrete, or blended and combined.

In order to create a desired color, the user can operate a graphic user-interface to select pixel regions on individual color lines. The user may perform an action, such as a click and drag, to designate an act of moving a display area from one color region 802 to another, or from one color region to a mixing region.

Numerous alternative implementations are possible as to how the user can designate an act where color from one color region 802 is mixed with color from another color region 802. For example, the user may click one color region, then click an adjacent color region on the same or adjacent color line 810 to see a blended color formation. The blended color region may be displayed to the user at any region of the user-interface 800, and not just between adjacent color formations. When blending two color regions, the user can weight one color region more than another color region. For example, the user can click one color region 802 to add more of it to the blend.

According to an embodiment, when the user forms the desired color, programming or other logic may be combined with the user-interface 800 to enable the user to perform some other end task. For example, the software can inform the user what paint tubes he needs to form the desired color, and how much of each paint is needed to form the component of the desired color.

Figure 8:
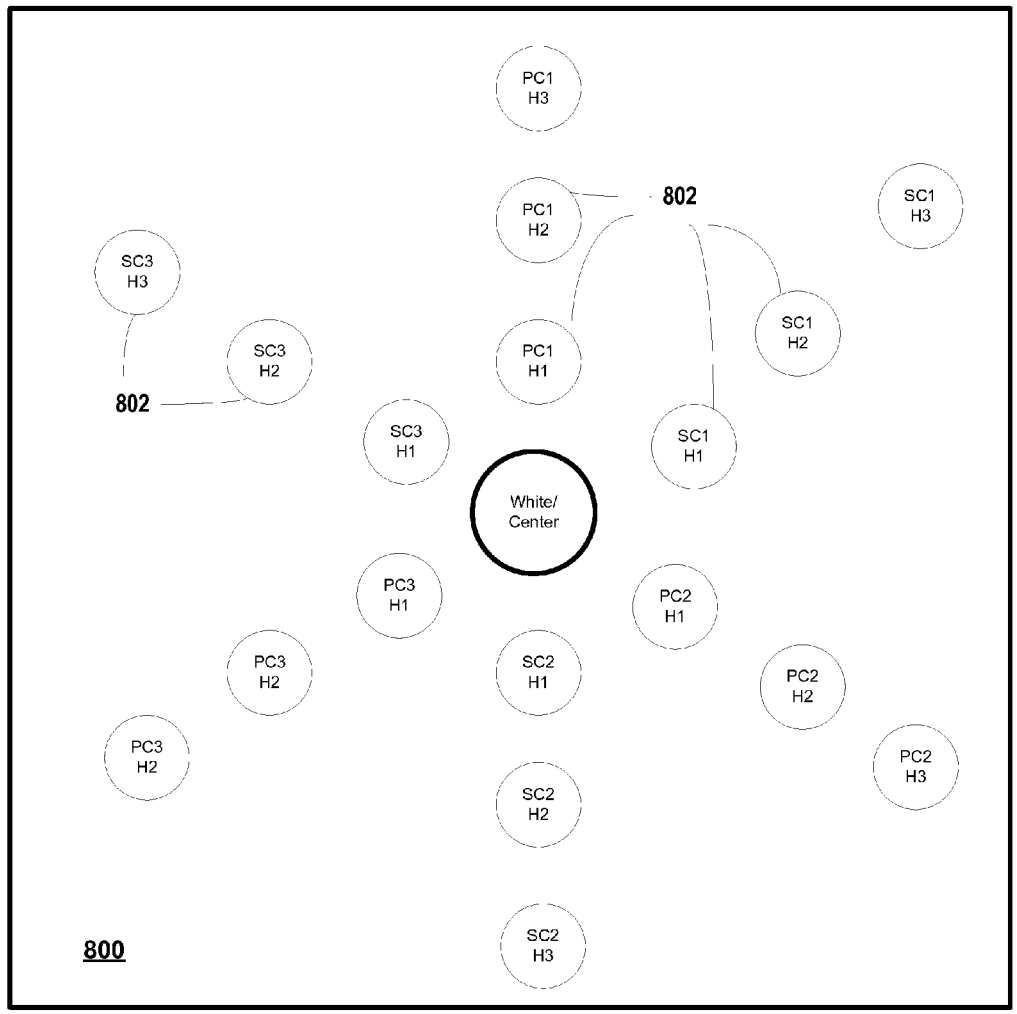
FIG. 8 illustrates a computer-generated user-interface for displaying a color wheel, under an embodiment of the invention.

With regard to an embodiment such as described with FIG. 8, a user-interface 800 may be generated by instructions in the form of one or more programs, applications, sequence of code and/or other logic. The user-interface 800 may aid the user in performing techniques such as described above with other embodiments (including techniques for in-line and cross-line blending, as well adding tint or tones). Under one or more embodiments, the code for generating the user-interface 800 may be carried on one or more computer-readable mediums. The instructions may be executed by one or more processors to achieve the functionality described with FIG. 8, or with any other embodiment of the invention. There are numerous types of processing resources and memory from which instructions may be stored and executed. Examples of such processing resources and computer-readable mediums include processor(s) and various forms of memory for holding data and instructions. Further examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

ALTERNATIVE EMBODIMENTS

While one or more embodiments described herein provide for a "wheel", the specific shape of geometry used is not necessary to practice embodiments such as described above. For example, the color lines may form spokes of the wheel, but they may also be aligned linearly.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for creating a desired color, the method comprising:
   using a plurality of color lines on a physical medium on which paint can be mixed by a user, wherein the plurality of color lines include:
   (i) a primary set of color lines, including a first color line, a second color line, and a third color line, wherein each color line in the primary set is for a corresponding primary color that is different than a primary color of another color line in the primary set, and wherein each color line in the primary set includes a plurality of color formations that each have a common range of hues that are different of hues of the other color lines in the primary set,
   (ii) a secondary set of color lines, wherein each color line in the secondary set is for a corresponding secondary color, wherein at least one color line from the secondary set is provided to transition from one color line in the primary set to another color line in the primary set, and wherein each color line in the secondary set includes a plurality of color formations for the corresponding secondary color,
   wherein the plurality of color formations for each color line in the primary set and in the secondary set are arranged from a lowest intensity to a highest intensity; and
   cross-color line mixing a paint of each of two or more color formations to achieve a mixed paint of the desired color, wherein cross-color line mixing includes:
   (i) forming a first mixture by in-line mixing the paint of each of two or more color formations of a first selected color line, the first selected color line corresponding to one of the primary or secondary color lines; and
   (ii) mixing the first mixture and a paint of each of one or more color formations of a second selected color line that is adjacent to the first selected color line to achieve the mixed paint of the desired color.

2. The method of claim 1, wherein the physical medium is selected from a group consisting of: (i) a tray on which paint is grouped, and (ii) a kit on which the color lines of the primary and secondary set are provided a plurality of repositories to collect a paint corresponding to each color in each color line of the primary and secondary set.

3. The method of claim 1, wherein the primary colors for the primary set of color lines is red, blue and yellow.

4. The method of claim 1, further comprising:
   for the desired color, determining that the desired color includes a tint or a tone; and
   adding white to either of the paint of the desired color or the first mixture to achieve the tint or the tone.

5. The method of claim 4, wherein adding white includes adding white to the paint of the highest intensity color of either the primary or secondary set of color lines to achieve the tint.

6. The method of claim 4, wherein adding white includes adding white to the paint of the lowest intensity color of the primary of secondary set of color lines to achieve the tone.

7. A non-transitory computer-readable medium that stores instructions for enabling a person to create a desired color, wherein the instructions include instructions, that when executed by one or more processors, cause the one or more processors to perform steps comprising:
   displaying a plurality of color lines, the plurality of color lines including:
   (i) a primary set of color lines, the primary color lines including a first color line, a second color line, and a third color line, wherein each color line in the primary set is for a corresponding primary color that is different than a primary color of another color line in the primary set, and wherein each color line in the primary set includes a plurality of color formations that each have a common range of hues that are different of hues of the other color lines in the primary set, wherein the plurality of color formations of each color line are arranged from a highest intensity to a lowest intensity,
   (ii) a secondary set of color lines, wherein each color line in the secondary set is for a corresponding secondary color, wherein at least one color line from the secondary set is provided to transition from one color line in the primary set to another color line in the primary set, and wherein each color line in the secondary set includes a plurality of color formations for the corresponding secondary color,
   detecting an input action by the person corresponding to the person selecting (i) a first color formation from a first color line that is one of the primary or secondary set of color lines, and (ii) a second color formation that is adjacent to the first color line;
   cross-color line mixing two or more color formations to achieve the desired color, including:
   (i) in-line mixing two or more color formations of a first selected color line in order to form a first component of the desired color, the first selected color line corresponding to one of the primary or secondary color lines;
   (ii) determining a second component of the desired color using one or more color formations of a second selected color line that is adjacent to the first selected color line; and
   (iii) mixing the color formations of the first component and the second component to achieve the desired color.

8. The non-transitory computer-readable medium of claim 7, further comprising instructions that when executed, cause the one or more processors to identifying one or more coloring materials that a person can use to mix and form the desired color.

9. The non-transitory computer-readable medium of claim 8, wherein the coloring materials identified are paint tubes.

* * * * *